United States Patent
Hanaoka et al.

(10) Patent No.: US 6,584,103 B1
(45) Date of Patent: Jun. 24, 2003

(54) PACKET COMMUNICATION APPARATUS PROVIDED WITH MANAGER MEANS FOR MANAGING PACKET LABELS

(75) Inventors: Kunihiro Hanaoka, Kobe (JP); Shoji Akashita, Shinagawa-ku (JP); Osamu Tomioka, Shinagawa-ku (JP); Mitsukazu Kurose, Suwa (JP)

(73) Assignees: Kobe Steel, Ltd., Hyogo (JP); Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/476,207

(22) Filed: Dec. 30, 1999

(30) Foreign Application Priority Data

Mar. 3, 1999 (JP) ............................................ 11-055066

(51) Int. Cl.[7] .............................................. H04L 12/56
(52) U.S. Cl. ...................... 370/389; 370/351; 370/392; 370/395.52; 710/107; 710/305; 709/250; 709/228
(58) Field of Search ................................. 370/351, 389, 370/395.52, 392, 400, 429, 352, 245.1, 399, 428, 412–419, 394, 229; 710/100, 105, 107, 305; 709/250, 224, 226, 200, 238

(56) References Cited

U.S. PATENT DOCUMENTS

| | | | |
|---|---|---|---|
| 4,993,024 A | | 2/1991 | Quinquis et al. |
| 5,623,492 A | | 4/1997 | Teraslinna |
| 5,872,783 A | * | 2/1999 | Chin ..................... 370/395.32 |
| 5,917,820 A | * | 6/1999 | Rekhter ....................... 370/392 |
| 5,991,300 A | * | 11/1999 | Tappan ....................... 370/392 |

(List continued on next page.)

FOREIGN PATENT DOCUMENTS

| | | |
|---|---|---|
| EP | 0 613 316 A2 | 12/1993 |
| JP | 10-023070 | 1/1998 |
| JP | 10-93623 | 4/1998 |
| JP | 10-93623 | 10/1998 |
| JP | 2000-151656 | * 5/2000 |

OTHER PUBLICATIONS

Technical Editor, Peter Johansson, "Serial Bus Protocol 2 (SBP–2)," Working Draft, American National Standard for Information Systems, T10, Project 1155D, Revision 4, pp. 1–95 (May 19, 1998).

(List continued on next page.)

*Primary Examiner*—Dang Ton
*Assistant Examiner*—Van Nguyen

(57) ABSTRACT

A packet communication apparatus is provided for transmitting a packet with a label for distinguishing each packet to each destination apparatus, and receiving a response packet with the same label transmitted from each destination apparatus. A plurality of application units respectively provide a plurality of functions which are independent of each other, and each application unit requests for issuing a label in accordance with start of a process of the function, and returns the issued label upon completion of the same process of the function. One common memory is provided in common for a plurality of application units, and stores a plurality of labels added to a header of each packet to distinguish a plurality of packets whose destination apparatus is identical. Further, a label manager allows and inhibits use of respective labels stored in the common memory, and issues the labels stored in the common memory in accordance with a request for issuing the labels so that labels attached to all packets transmitted to the same destination apparatus are different from each other by inhibiting use of the labels which has been already allowed for a sequence of communication until completion of the sequence of communication.

2 Claims, 5 Drawing Sheets

U.S. PATENT DOCUMENTS

| | | | | | |
|---|---|---|---|---|---|
| 6,101,215 | A | * | 8/2000 | Takeda et al. | 375/221 |
| 6,337,861 | B1 | * | 1/2002 | Rosen | 370/389 |
| 6,341,319 | B1 | * | 1/2002 | Inoue et al. | 710/52 |
| 6,408,355 | B1 | * | 6/2002 | Toguchi | 710/314 |
| 6,457,079 | B1 | * | 9/2002 | Hanaoka et al. | 710/105 |
| 6,463,059 | B1 | * | 10/2002 | Movshovich et al. | 370/389 |
| 6,496,509 | B1 | * | 12/2002 | Fant | 370/400 |

OTHER PUBLICATIONS

European Search Report dated Feb. 21, 2002, search performed in The Hague.

Japanese Patent Office action for P11–055066 dated May 16, 2000.

Information technology–Serial Bus Protocol 2 (SBP–2), by Peter Johansson.

* cited by examiner

PACKET COMMUNICATION APPARATUS PROVIDED WITH MANAGER MEANS FOR MANAGING PACKET LABELS

BACKGROUND OF THE INVENTION

1. Field of the Invention

The present invention relates to a packet communication apparatus, and more particularly, to a packet communication apparatus provided with manager means for managing packet labels, in which the packet communication apparatus is connected with a serial bus conformed to IEEE 1394, and the packet communication apparatus is, for example, computers, peripheral equipments such as a printer or the like, various domestic digital equipments such as a digital still camera or the like.

2. Description of the Related Art

For example, an ANSI X3.131-1986 Small Computer System Interface proposed by the ANSI (American National Standards Institute, Inc.) has been widely used thus far as an interface for carrying out data transmission between a personal computer, and peripheral equipments connected with the personal computer.

However, in so-called parallel SCSI standard of the above-mentioned interface standards, there is no rule relating to many matters such as a shape of a connector or cable, an operation of connecting equipments without power supply. As a result, problems arise in compatibility and convenience accompanying with popularization of the personal computer.

Moreover, in comparison with the time when the above-mentioned parallel SCSI standard has been proposed, recently, various domestic digital equipments are popularized. Further, a general household also requires a high speed interface which is adaptable for transmitting acoustic and image digital signal data.

Under such circumstances, some next-generation interface standards have been already proposed, and then, the IEEE 1394 interface is employed as an interface for transmitting data at a high speed between computers and peripheral equipments and between apparatuses including domestic equipments, and thus, digital equipments using the IEEE 1394 interface have been started to be merchandised.

The IEEE 1394 interface standard is proposed by IEEE (The Institute of Electrical and Electronics Engineers, Inc.), and then, is prescribed as IEEE Std. 1394-1995 IEEE Standard for a High Performance Serial Bus. More specifically, the IEEE 1394 interface standard is a very useful serial interface standard taking the use in a general household into consideration, that is, an interface conformed to the standard has a high transfer speed of several 100 Mbits/second, and supports a synchronous transfer, a hot-line insertion and drawing and a connection topology having a high degree of freedom. example, Japanese Patent Laid-open Publication (Kokai) No. 10-93623 discloses a technique of employing the above-mentioned IEEE 1394 interface.

As disclosed in the above publication, in the case of carrying out a digital data transmission with the use of a packet adding a destination information to a predetermined data block into which a digital data is divided, in order to improve the reliability of data transmission, when a packet transmitted from a transmitter equipment is received by a receiver equipment, the receiver equipment returns an acknowledgment signal indicative of a receiving state of the packet to the transmitter equipment of the printer apparatus 2, and then, retransmits the packet from the transmitter equipment as the necessity arises.

Also, in the IEEE 1394 interface, there is the case where the above acknowledgment signal from the receiver equipment to the transmitter equipment is returned with respect to a request packet for request for an operation thereof.

For example, in a packet communication between a personal computer 1a and a printer apparatus 2 mutually connected via the IEEE 1394 interface, as shown in FIG. 3, a request packet for requiring a predetermined operation is transmitted from the personal computer 1a to the printer apparatus 2, and then, when the request packet is received by the printer apparatus 2, the printer apparatus 2 returns an acknowledgment signal ACK indicative of a receiving state of the request packet to the personal computer 1a.

The acknowledgment signal ACK includes information data for informing retransmission necessity and completion of reception of the printer apparatus 2. For example, in the case where an acknowledgment signal ACK which requires retransmission is received by the personal computer 1a, the same request packet is retransmitted from the personal computer 1a to the printer apparatus 2. Then, in the case where a completion of reception is informed to the personal computer 1a by means of the above acknowledgment signal ACK, the printer apparatus 2 carries out a predetermined operation such as a print operation. Therefore, the personal computer 1a is in a waiting state until a response packet corresponding to the above request packet is transmitted from the printer apparatus 2.

Further, when a predetermined operation is completed in the printer apparatus 2, a response packet including the above predetermined operation result is transmitted from the printer apparatus 2 to the personal computer 1a. When the response packet is received by the personal computer 1a, an acknowledgment signal ACK indicative of a retransmission request or process completion is returned from the personal computer 1a to the printer apparatus 2. In this case, if the above acknowledgment signal ACK is indicative of a retransmission request, the same response packet is retransmitted from the printer apparatus 2 to the personal computer 1a. On the other hand, if the above acknowledgment signal ACK is indicative of process completion, the printer apparatus 2 is set to an opened state for the next process.

FIG. 4 shows a packet format of a packet for use in communications between equipments connected via the IEEE 1394 interface.

Referring to FIG. 4, a packet communicated via the IEEE 1394 interface is constructed in a manner that a packet header including a destination ID and a source ID is added to data. The packet header includes the followings:

(a) information such as a transaction code t-code used for representing a kind of packet, and a retry (rt) representing whether or not the packet is a retransmission; and (b) a transaction label t-Label for distinguishing a plurality of packets having the identical source and the identical destination from each other.

The transaction label t-Label is composed of mutually different 63 labels stored in a local memory, and is allocated to each packet.

In an example shown in FIG. 3, two request packets transmitted from the personal computer 1a to the printer apparatus 2, for instance, a transaction label n1 is added to a header of the first request packet, and a transaction label n2 is added to a header of the next request packet. Moreover, two response packets transmitted from the printer apparatus 2 to the personal computer 1a, for instance, a transaction label n3 is added to a header of the first response packet, and a transaction label n4 is added to a header of the next response packet.

In this case, the same transaction labels as those of the corresponding each of these packets are used in acknowledgment signals ACK of the above-mentioned request packet and response packet. For example, in an acknowledgment signal of the request packet to which the transaction label n1 is added, a transaction label n1 is added to a header of the request packet.

By the way, in equipments connected via the IEEE 1394 interface, there is an equipment including a plurality of functions such as a copy function, a scanner function, a printer function or the like. In the case where one equipment provides the above-mentioned plurality of functions, the above transaction label is managed for each application unit for providing each function. An application program for each application unit having a function is stored in the personal computer 1a, which then executes the application program.

Referring to FIG. 5, two application units U1 and U2 installed in the personal computer 1a can make an access to local memories LM1 and LM2 each storing 63 transaction labels, respectively, and different transaction label is allocated to each of plural communications which are carried out for each of the application units U1 and U2 and have the identical source and the identical destination.

For example, in two request packets transmitted from the personal computer 1a to the printer apparatus 2 by the process of the application unit U1, a transaction label n1 is allocated to the first packet, and a transaction label n2 is allocated to the next packet, sequentially. Moreover, in two request packets transmitted from the personal computer 1a to the printer apparatus 2 by the process of the application unit U2, a transaction label n1 is allocated to the first packet, and a transaction label n2 is allocated to the next packet, sequentially. In the manner as described above, different transaction labels are allocated respectively to a plurality of communications, which are carried out for each of application units U1 and U2 and have the identical source and the identical destination.

However, the management of the above-mentioned transaction label is carried out for each application unit including a local memory. Therefore, there may be such a case that the application units U1 and U2 utilize the same transaction label.

As seen from an example shown in FIG. 5, the same transaction label n1 is allocated to not only the first request packet transmitted from the personal computer 1a to the printer apparatus 2 by the process of the application unit U1, but also the first request packet transmitted from the personal computer 1a to the printer apparatus 2 by an operation of the application unit 2. Likewise, the same transaction label n2 is allocated to the next request packet. Thus, when the transaction labels mutually overlap, it may be judged that a transfer error is caused. Therefore, in the case of connecting a certain equipment comprising a plurality of application units each having a function via the IEEE 1394 interface with another equipment, the transaction labels mutually overlap. Therefore, there may be such apossibility that a transfer error is frequently caused.

SUMMARY OF THE INVENTION

In order to solve the above-mentioned problems in the prior art, it is, therefore, an essential object of the present invention to provide a packet communication apparatus capable of preventing a transfer error from taking place in the case of connecting a certain equipment comprising a plurality of application units via an interface with another equipment.

In order to achieve the aforementioned objective, according to one aspect of the present invention, there is provided a packet communication apparatus for transmitting a packet with a label for distinguishing each packet to each destination apparatus, and receiving a response packet with the same label transmitted from said each destination apparatus, comprising:

a plurality of application units for respectively providing a plurality of functions which are independent of each other, each application unit requesting for issuing a label in accordance with start of a process of said function, and returning the issued label upon completion of the same process of said function;

one common storage means for storing a plurality of labels added to a header of each packet to distinguish a plurality of packets whose destination apparatus is identical, said common storage means being provided in common for said plurality of application units; and label manager means for allowing and inhibiting use of respective labels stored in said common storage means, said label manager means issuing labels stored in said common storage means in accordance with a request for issuing the labels so that labels attached to all packets transmitted to the same destination apparatus are different from each other by inhibiting use of the labels which has been already allowed for a sequence of communication until completion of said sequence of communication.

In the above-mentioned packet communication apparatus, the packet is preferably transmitted to said each destination apparatus via a serial bus conformed to an IEEE 1394 standard.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

In order to further clearly understand the present invention, preferred embodiments according to the present invention will be described below with reference to the attached drawings. The following preferred embodiment is one example of the present invention, and a technical range of the present invention is not limited to the present preferred embodiment.

Figure 1:
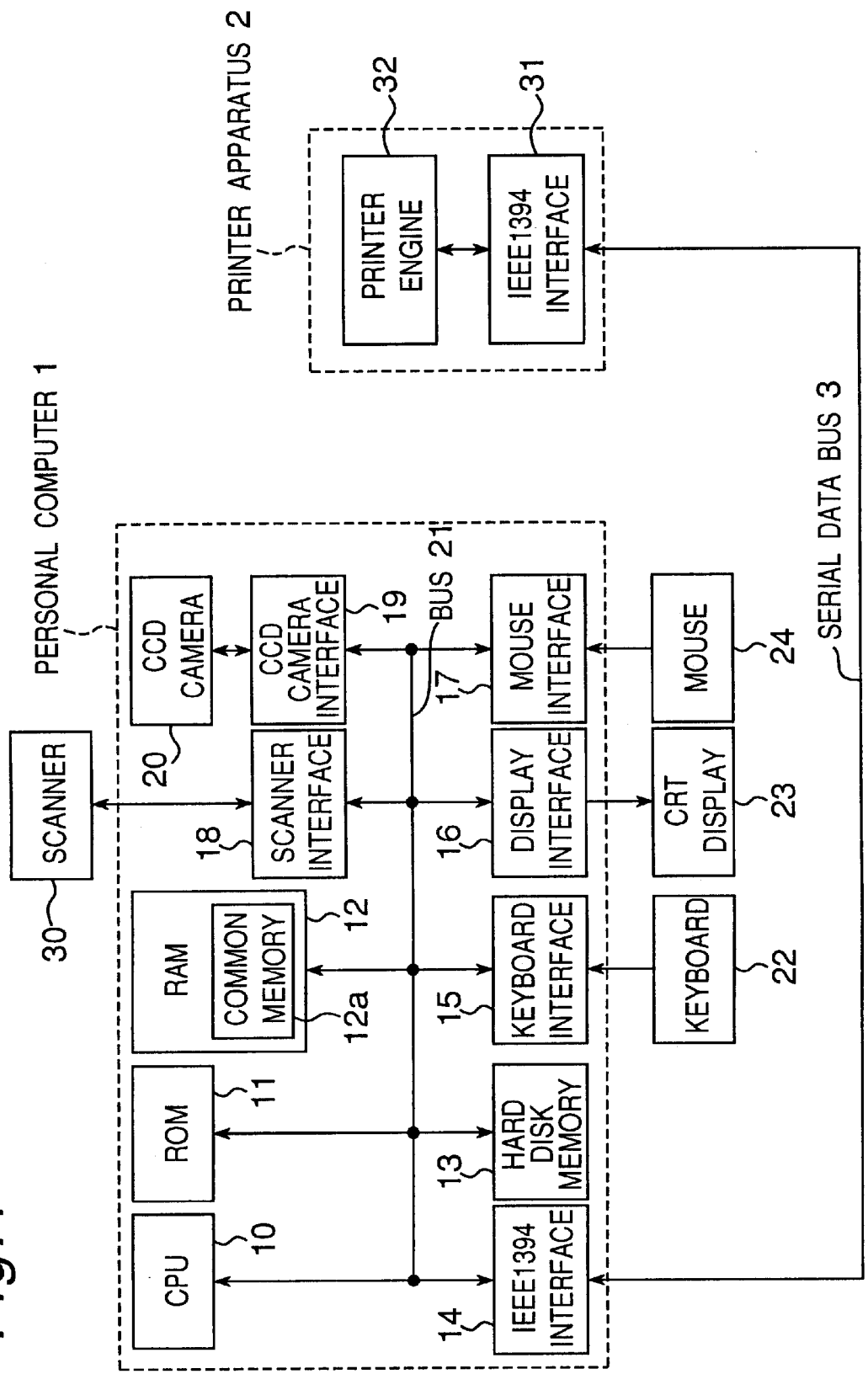
FIG. 1 is a block diagram showing a configuration of a communication system comprising a personal computer 1 and a printer apparatus 2 connected via a serial data bus 3 conformed to the IEEE 1394 interface standard, according to a preferred embodiment of the present invention.
Figure 2:
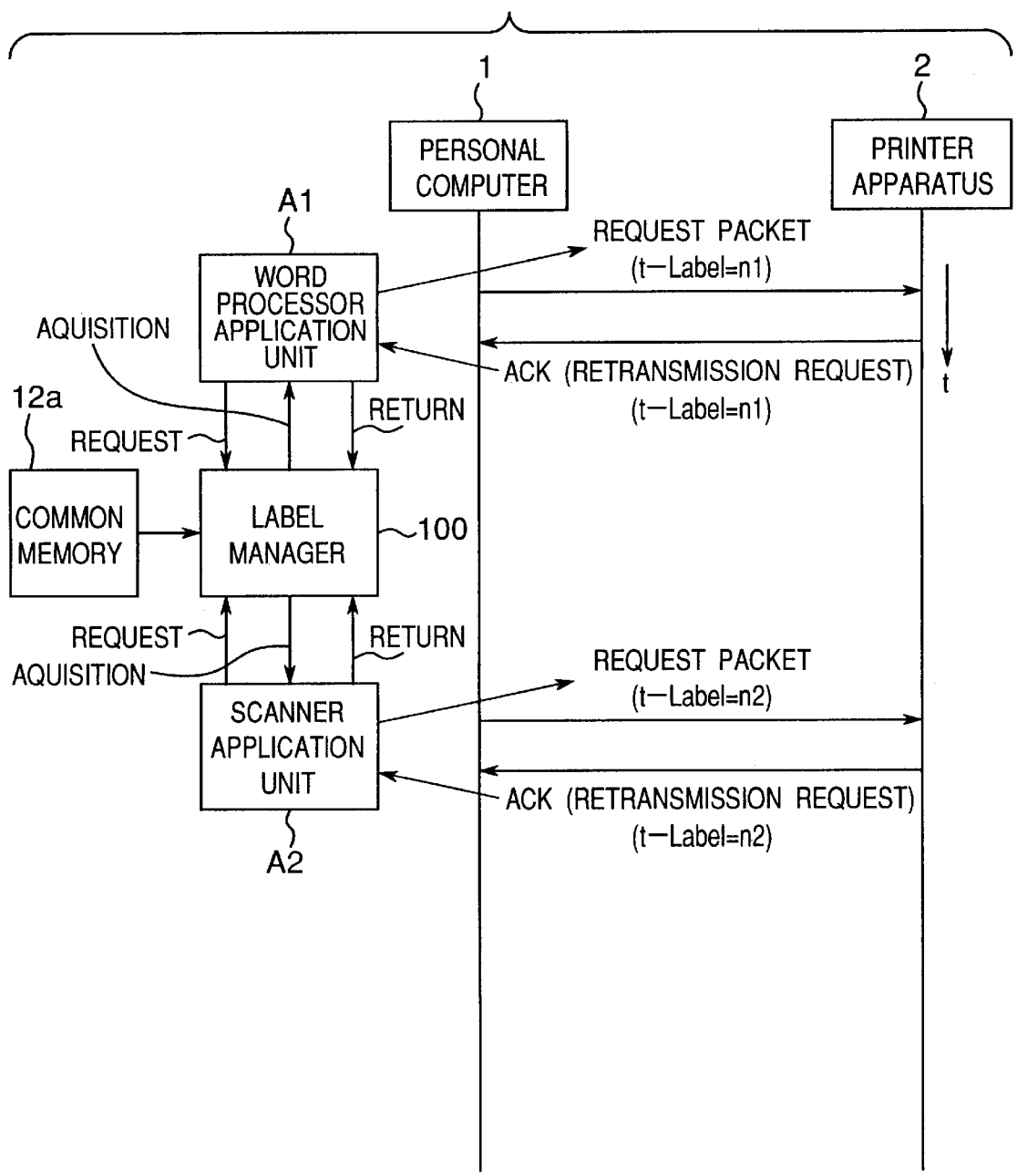
FIG. 2 is a block diagram showing a configuration of a label manager 100 and peripheral units, and a timing chart showing a communication sequence between the personal computer 1 and a printer apparatus 2 shown in FIG. 1.
Figure 3:
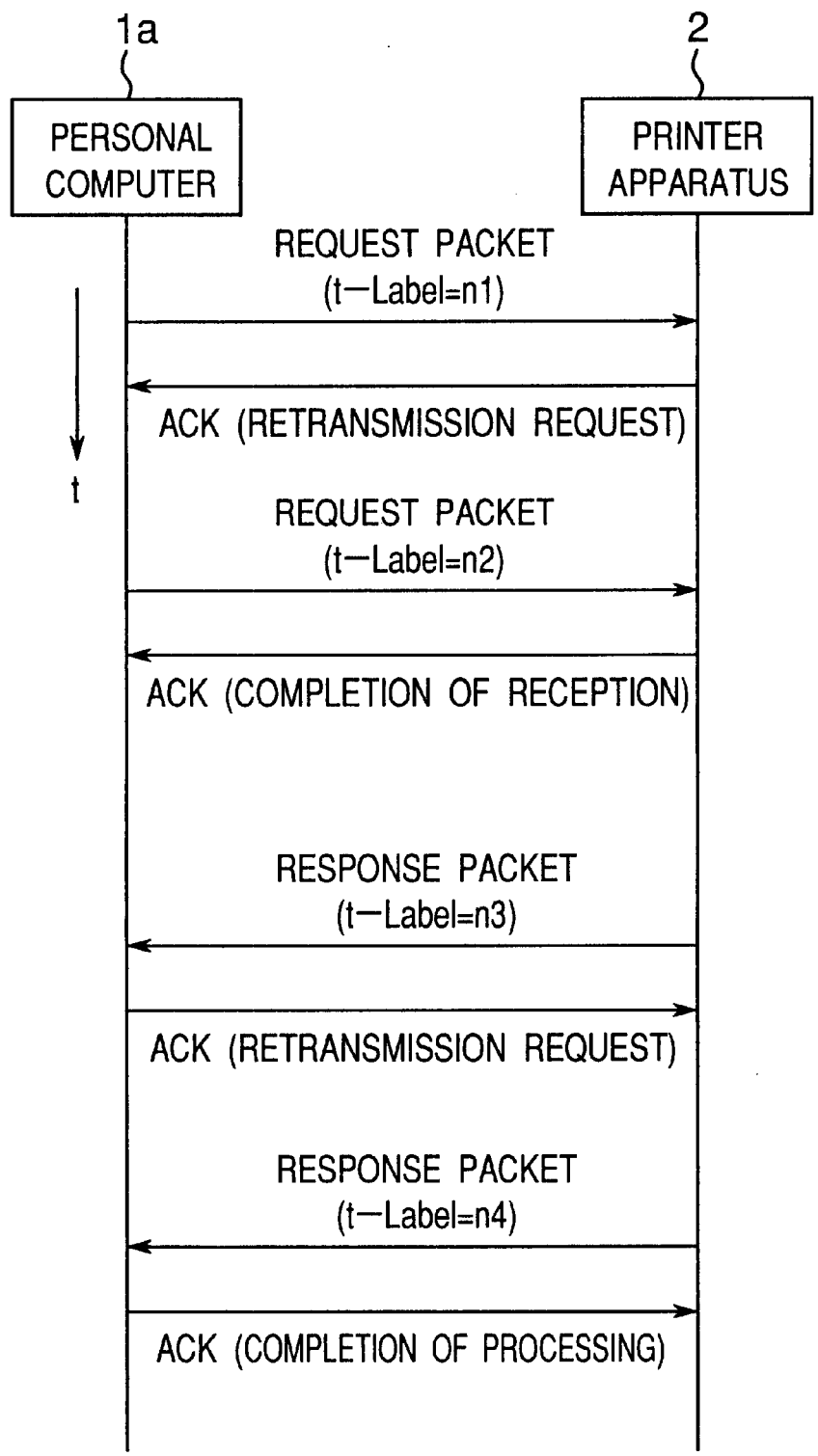
FIG. 3 is a timing chart showing a communication sequence between a personal computer 1a and a printer apparatus 2 connected with each other via the IEEE 1394 interface of prior art.
Figure 4:
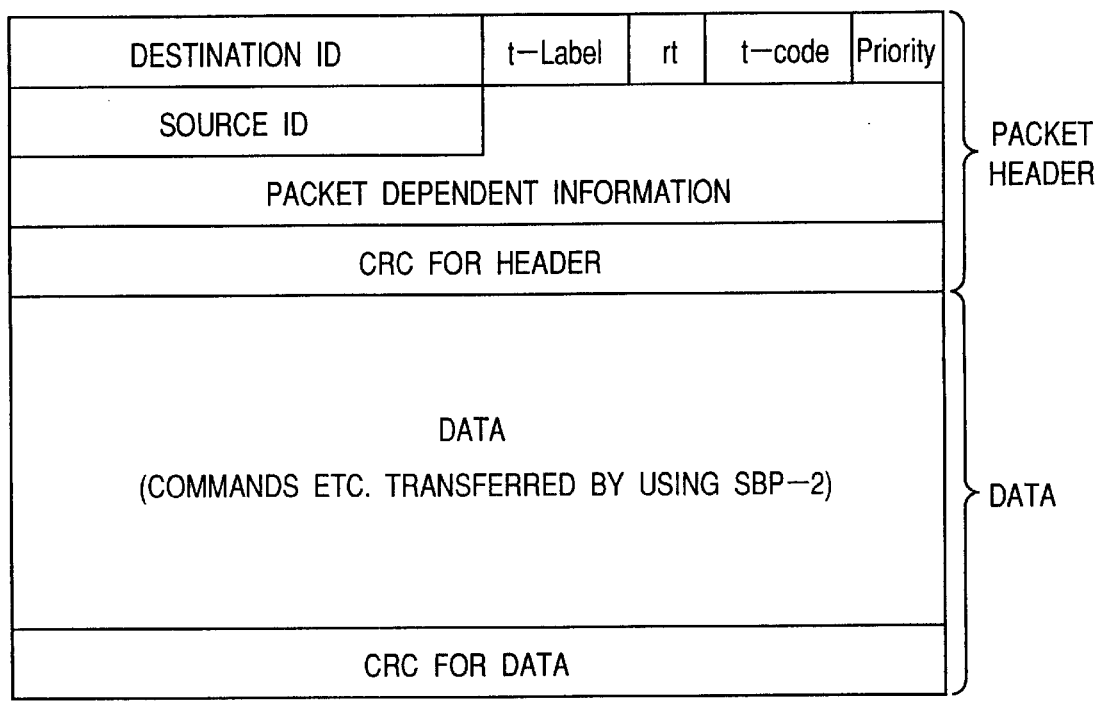
FIG. 4 is a schematic diagram showing one example of a packet format of a packet for use in the IEEE 1394 interface.

FIG. 1 is a block diagram showing a configuration of a communication system comprising a personal computer 1 and a printer apparatus 2 connected via a serial data bus 3 conformed to the IEEE 1394 interface standard, according to a preferred embodiment of the present invention, and FIG. 2 is a block diagram showing a configuration of a label manager 100 and peripheral units, and a timing chart showing a communication sequence between the personal computer 1 and a printer apparatus 2 shown in FIG. 1.

Referring to FIG. 1, the communication system of the present preferred embodiment comprises the personal computer 1 having a packet communication apparatus and the printer apparatus 2 having another packet communication apparatus. In the communication system, an IEEE 1394 interface of the personal computer 1 is connected with another IEEE 1394 interface of the printer apparatus 2 via the serial data bus 3 conformed to the IEEE 1394 standard. As peripheral units of the personal computer 1, there are provided a keyboard 22, a CRT display 23, a mouse 24 and a scanner 30.

The personal computer 1 comprises the followings:

(a) a CPU (central processing unit) 10 of a digital computer for executing operating system programs and application programs stored in a ROM 11 and a hard disk memory 13 to control the operation and process of the personal computer 1;

(b) the ROM (read-only memory) 11 for storing basic programs such as operation programs and data required for execution of the programs;

(c) RAM (random access memory) 12 for operating as a working memory of the CPU 10, and for temporarily storing parameters and data needed for the operation and process of the personal computer 1, where the RAM 12 includes a common memory 12a for storing a plurality of labels added to a header of each packet to distinguish a plurality of packets whose destination apparatus such as the printer apparatus 2 is identical, and the common memory 12a is provided in common for a plurality of application units such as a word processor application unit A1 shown in FIG. 2, a scanner application unit A2 shown in FIG. 2, CCD camera application unit (not shown), or the like;

(d) a hard disk memory 13, for example, for storing the application programs and data used upon executing the application programs;

(e) the IEEE 1394 interface 14 for performing signal conversion, and transmitting and receiving processes conformed to the IEEE 1394 standard, for packet data which are transmitted from the CPU 10 to the printer apparatus 2, and which are received from the printer apparatus 2;

(f) a keyboard interface 15 connected with the keyboard 22 which is provided for inputting predetermined data or instruction commands, where the keyboard interface 15 receives data and instruction commands inputted through the keyboard 22, performs an interface process such as a predetermined signal conversion or the like, and transmits the data or the instruction commands to the CPU 10;

(g) a display interface 16 connected with the CRT display 23 which displays an image of image data or information data processed by the CPU 10, or an image for inputting setting data, instruction data, or the like, where the display interface 16 converts the image data to be displayed into an image signal for the CRT display 23, outputs the image signal to the CRT display 23, and allows the CRT display 23 to display the image of the image signal;

(h) a mouse interface 17 connected with the mouse 24 which is provided for inputting instruction commands on the CRT display 23, where the mouse interface 17 receives data or the instruction commands inputted through the mouse 24, performs an interface process such as a predetermined signal conversion or the like, and transmits the data or the instruction commands to the CPU 10;

(i) a scanner interface 18 connected with the scanner 30 which is provided for reading an image and converting a read image into an image signal, where the scanner interface 18 receives the image signal outputted from the scanner 30, performs an interface process such as a predetermined signal conversion or the like, and transmits the image signal to the CPU 10 or the hard disk memory 13;

(j) a CCD camera 20 provided in the personal computer 1, where the CCD camera 20 takes a picture image, converts the image into an image signal, and outputs the same image signal to the CPU 10 or the hard disk memory 13; and (k) a CCD camera interface 19 connected with the CCD camera 20, where the CCD camera interface 19 receives the image signal outputted from the CCD camera 20, performs an interface process such as a predetermined signal conversion or the like, and transmits the image signal to the CPU 10 or the hard disk memory 13, where these circuits 10–19 are connected through an internal bus 21.

Further, the printer apparatus 2 comprises the followings:

(a) the IEEE 1394 interface 31 connected with a printer engine 32, where the IEEE 1394 interface performs signal conversion, and transmitting and receiving processes conformed to the IEEE 1394 standard, for packet data which are transmitted from the printer engine 32 to the personal computer 1, and which are received from the personal computer 1; and (b) the printer engine 32 for printing on a sheet of paper an image of image data included packet data received by the IEEE 1394 interface 31.

In the hard disk memory 13, for example, a word processor application program, a scanner application program including image data copying, a CCD camera application program, and the like are stored for executing a plurality of functions. When the CPU 10 executes the word processor application program, the CPU 10 serves as a word processor application unit A1 shown in FIG. 2, which has a function of editing and outputting character or image data. Also, when the CPU 10 executes the scanner application program, the CPU 10 serves as a scanner application unit A2 shown in FIG. 2, which has a function for editing and outputting image data from the scanner 30. Further, when the CPU 10 executes the CCD camera application program, the CPU 10 serves as a CCD camera application unit (not shown), which has a function for editing and outputting image data from the CCD camera 20.

Further, a packet communication program for managing the packet communication between the personal computer 1 and the printer apparatus 2 is stored in the hard disk memory 13. When the CPU 10 executes the packet communication program, the CPU 10 serves as the label manager 100 for allowing and inhibiting use of respective labels stored in the common memory 12a. In a manner as described in detail later, the label manager 100 issues labels by selecting labels among the labels stored in the common memory 12a, in accordance with a request for issuing the labels, so that labels attached to all packets transmitted to the same destination apparatus such as the printer apparatus 2 are different from each other by inhibiting use of the labels which has been already allowed for a sequence of communication until completion of said sequence of communication.

Referring to FIG. 2, the label manager 100 is connected with the common memory 12a since the CPU 10 is connected with the RAM 12 via the bus 21. Further, the label manager 100 is operatively connected with both of the word processor application unit Al and the scanner application unit A2.

The personal computer 1 having the packet communication apparatus is characterized in, in particular, comprising the label manager 100 and the common memory 12a. The process of the packet communication apparatus will be described below in detail.

The common memory 12a previously stores 63 labels t-Label having different values, and then, each of the application units A1 and A2 requests for acquisition of a label t-Label to the label manager 100 for managing the common memory 12a. In accordance with a request from each of the application units A1 and A2, the label manager 100 selects a certain label t-Label among the labels stored in the common memory 12a, and gives the selected label t-Label to each of the application units A1 and A2, then the selected label t-Label is acquisitioned by each of the application units A1 and A2. In this case, the use of the selected label t-Label is inhibited for all the application units A1 and A2 until completion of a sequence of the packet communication using the selected label t-Label. If another request for a label is made, a label different from the selected label t-Label is given to each of the application unit A1 and A2.

Next, an example of an operation of the packet communication will be described between the personal computer 1 and the printer apparatus 2.

First of all, the application unit A1 requests for a label t-Label to the label manager 100. In this stage, no label is used. Therefore, the label manager 100 allows use of a label n1, for example. When the use of the label n1 is allowed by means of the label manager 100, the label n1 is read out from the common memory 12a by the label manager 100, and then, is added to a header of a request packet, which is then transmitted from the personal computer 1 to the printer apparatus 2 by the operation of the application unit A1.

Next, when the printer engine 32 of the printer apparatus 2 receives the request packet having the header including the label n1 from the personal computer 1, the printer engine 32 of the printer apparatus 2 returns an acknowledgment signal ACK representing a retransmission and completion of reception to the personal computer 1 in accordance with the condition at that time.

Figure 5:
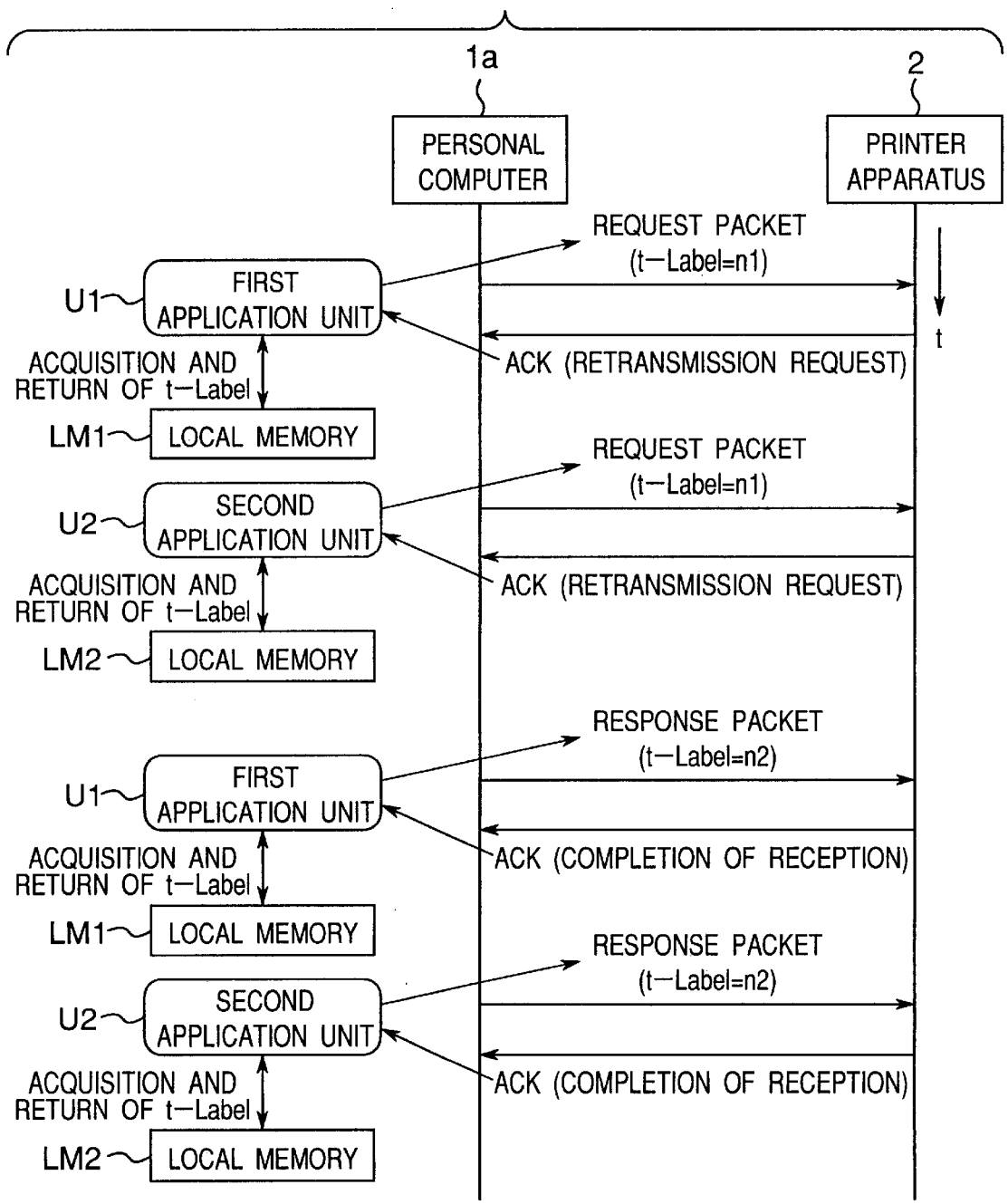
FIG. 5 is a block diagram showing a configuration of local memories LM1 and LM2 and first and second application units U1 and U2 which are provided in a prior art personal computer 1a, and a timing chart showing a communication sequence between the personal computer 1a and the printer apparatus 2.

The header of the acknowledgment signal ACK returned from the printer apparatus 2 to the personal computer 1 has also the substantially same format as that shown in FIG. 5. The same label n1 as that of the request packet transmitted from the personal computer 1 to the printer apparatus 2 is used as a label t-Label of the acknowledgment signal ACK.

Thereafter, when the personal computer 1 receives the acknowledgment signal ACK from the printer apparatus 2, a label contained in the acknowledgment signal ACK is verified or checked. In the case where the same label n1 is contained in the acknowledgment signal ACK, the application unit A1 informs the label manager 100 that a sequence of packet communication relating to the above request packet is completed. When the label manager 100 receives such information that a sequence of packet communication is completed, and then, the common memory 12a is set to such a state that the label n1 can be used again. Thereafter, when the application unit A2 requests for a label to the label manager 100, it is possible to allocate the label n1 to a packet of the application unit A2.

On the other hand, in such a case that the acknowledgment signal ACK is not returned and a sequence of packet communication is not completed with respect to the request packet having the header of the label n1 from the personal computer 1 to the printer apparatus 2 by the operation of the application unit A1, when the other application unit A1 requests for a label to the label manager 100, the labels which have been already used are retrieved by access of the label manager 100 to the common memory 12a, and in this case, the use of the label n1 is not allowed, and then, another label n2 is allocated to the request packet for the application unit A2.

Thereafter, when the request packet to which the label n2 is allocated is transmitted from the personal computer 1 to the printer apparatus 2 and is then received by the printer apparatus 2, in a manner similar to that of the case that the label n1 is allocated, an acknowledgment signal ACK to which the same label n2 is allocated is returned from the printer apparatus 2 to the personal computer 1.

Until the acknowledgment signal ACK to which the same label n2 is allocated is received by the personal computer 1 and then the information is given to the label manager 100 from the application unit A1, the use of the label n2 is inhibited by means of the label manager 100, and then, the label n2 becomes re-usable when the information is given to the label manager 100. This is the same as the case of the label n1.

As described above, in the personal computer 1 having the packet communication apparatus of the present preferred embodiment, the common memory 12a for storing the labels is shared in common for all the application units A1 and A2 included in the personal computer 1 of the source apparatus, and further, the label manager 100 inhibits use of the labels which has been already allowed for a sequence of communication until completion of said sequence of communication so that the labels attached to all packets transmitted to the same destination apparatus are different from each other. Moreover, in the case of connecting a certain equipment having a plurality of functions to the serial data bus 3 conformed to IEEE 1394, it is possible to prevent a transfer error from taking place.

In the present preferred embodiment, there is provided only two equipments including the personal computer 1 and the printer apparatus 2 which are connected with each other via the serial data bus 3 conformed to IEEE 1394, for simplification. The present invention is not limited to this, and can be applied to such a case that three or more equipments are connected via a bus.

Further, in the present preferred embodiment, only the personal computer 1 has the common memory 12a in common, and the label manager 100 manages the common memory 12*a*. The present invention is not limited to this. In such a case that the printer apparatus 2 and the other equipments which are connected via a serial data bus and each of which has a plurality of functions, the present invention can be applied to these equipments so as to prevent a transfer error from taking place due to overlap or duplication of transaction label.

In addition, the packet managed by the label manager 100 is not limited to the request packet shown in the above preferred embodiment, and may be also applicable to a response packet or the other packet.

Furthermore, in the above preferred embodiment, one equipment such as the personal computer 1 includes two application units A1 and A2 having different functions. The present invention is not limited to this, and even in the case where one equipment includes three or more application units, all the application units have the common memory 12*a* in common, and the common memory 12*a* is managed by means of the label manager 100. In this case, it is possible to prevent overlap or duplication of the transaction label.

Furthermore, in the case of using the serial data bus 3 conformed to the IEEE 1394 standard for purpose of connecting a plurality of equipments with each other, it is possible to carry out data transfer at a high speed with the use of, for example, an SBP-2 (Serial Bus Protocol 2) which is one of application protocols of the IEEE 1394 standard. The above-mentioned personal computer 1 and the printer apparatus 2 are equivalent to an initiator apparatus or a target apparatus in the SBP-2, and these apparatuses function as nodes connected via the serial data bus.

In the preferred embodiment, the printer apparatus 2 is provided, however, the present invention is not limited to this. In stead of the printer apparatus 2, various kinds of peripheral apparatuses such as scanners, CCD cameras, modem units, terminal adapters, routers, or the like can be provided.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A packet communication apparatus for transmitting a packet with a label for distinguishing each packet to each destination apparatus, and receiving a response packet with the same label transmitted from said each destination apparatus, comprising:

a plurality of application units for respectively providing a plurality of functions which are independent of each other, each application unit requesting for issuing a label in accordance with start of a process of said function, and returning the issued label upon completion of the same process of said function;

one common storage means for storing a plurality of labels added to a header of each packet to distinguish a plurality of packets whose destination apparatus is identical, said common storage means being provided in common for said plurality of application units; and label manager means for allowing and inhibiting use of respective labels stored in said common storage means, said label manager means issuing labels stored in said common storage means in accordance with a request for issuing the labels so that labels attached to all packets transmitted to the same destination apparatus are different from each other by inhibiting use of the labels which has been already allowed for a sequence of communication until completion of said sequence of communication.

2. The packet communication apparatus as claimed in claim 1, wherein the packet is transmitted to said each destination apparatus via a serial bus conformed to an IEEE 1394 standard.

\* \* \* \* \*

UNITED STATES PATENT AND TRADEMARK OFFICE
CERTIFICATE OF CORRECTION

PATENT NO.     : 6,584,103 B1
DATED          : June 24, 2003
INVENTOR(S)    : Hanaoka et al.

It is certified that error appears in the above-identified patent and that said Letters Patent is hereby corrected as shown below:

<u>Title page,</u>
Item [56], References Cited, U.S. PATENT DOCUMENTS, please add
-- 4,703,475 --
OTHER PUBLICATIONS, please add -- Gary Hoffman et al., "IEEE 1394: a Ubiquitous Bus", IEEE (1995), pp. 334-338 --

Signed and Sealed this

Second Day of December, 2003

JAMES E. ROGAN
*Director of the United States Patent and Trademark Office*